United States Patent
Kemmner et al.

(10) Patent No.: US 7,971,697 B2
(45) Date of Patent: Jul. 5, 2011

(54) COUPLING DEVICE

(75) Inventors: Benjamin Kemmner, Unterensingen (DE); Albrecht Schaefer, Uhingen (DE)

(73) Assignee: Daimler AG, Stuttgart (DE)

( * ) Notice: Subject to any disclaimer, the term of this patent is extended or adjusted under 35 U.S.C. 154(b) by 695 days.

(21) Appl. No.: 10/592,504

(22) PCT Filed: Mar. 9, 2005

(86) PCT No.: PCT/EP2005/002464
§ 371 (c)(1),
(2), (4) Date: Jun. 5, 2008

(87) PCT Pub. No.: WO2005/088148
PCT Pub. Date: Sep. 22, 2005

(65) Prior Publication Data
US 2008/0236980 A1    Oct. 2, 2008

(30) Foreign Application Priority Data
Mar. 12, 2004  (DE) .......................... 10 2004 012 117

(51) Int. Cl.
*F16D 25/0638* (2006.01)
(52) U.S. Cl. ............... 192/85.24; 192/85.61; 192/85.63; 192/113.34
(58) Field of Classification Search ............... 192/85.61, 192/113.34
See application file for complete search history.

(56) References Cited

U.S. PATENT DOCUMENTS

| 3,351,169 A | 11/1967 | McIndoe | |
|---|---|---|---|
| 4,644,968 A | 2/1987 | Chatterjea | |
| 6,827,191 B2 * | 12/2004 | Kuhstrebe | 192/48.92 |
| 2004/0159523 A1 * | 8/2004 | Duan et al. | 192/85 CA |

FOREIGN PATENT DOCUMENTS
DE    198 38 443 A1   3/1999

OTHER PUBLICATIONS
International Search Report dated Jul. 25, 2005 with an English translation of the pertinent portions (Four (4) pages).

* cited by examiner

*Primary Examiner* — Richard M. Lorence
(74) *Attorney, Agent, or Firm* — Crowell & Moring LLP

(57) ABSTRACT

A clutch device for a motor vehicle has friction elements around which coolant flows and which, by way of a piston, can be pressed against one another for torque transmission. The first piston side is acted on with operating pressure, and the second piston side is acted on with coolant pressure. A valve, by which the operating pressure can be set, and a device which makes a reaction of the coolant pressure on the operating pressure possible are provided. The device is designed as a hydraulic resistance cascade and is connected between coolant supply and coolant return lines of the friction elements. A return pressure line branches off in the center of the hydraulic resistance cascade and is connected to the valve.

20 Claims, 4 Drawing Sheets

COUPLING DEVICE

BACKGROUND AND SUMMARY OF THE INVENTION

This invention relates to a coupling device such as a clutch device.

A clutch device which has a converter with a friction clutch comprising friction elements is known from German patent specification DE 198 38 443 C1. A first side of a piston can be acted on with an operating pressure, so that the friction elements are pressed together and torque transmission takes place. Cooling oil moreover flows through the friction elements. The friction clutch is supplied with cooling oil via a supply line and a return line. A valve which delivers a corresponding operating pressure when a control pressure is specified is provided for activating the friction clutch. The pressure of the cooling oil flow acts on a second side of the piston counter to the operating pressure. In order to compensate for reactions of pressure variations on the second side of the piston on the operating pressure, the pressure present outside the clutch is at the end of the coolant return line applied to the valve. The operating pressure is thus corrected to the pressure variations in the coolant return line.

It is an object of the invention to provide a clutch device in which the operating pressure correction takes place more accurately, that is as a function of the pressure present on the second side of the piston.

This object is achieved by a clutch device with the features claimed.

The clutch device according to the invention is designed as a hydraulic resistance cascade and is connected between coolant supply and coolant return lines of the friction elements of a clutch, a return pressure line branching off in the center of the hydraulic resistance cascade being connected to a valve. The hydraulic resistance cascade has two resistances via which a bypass oil flow flows from the coolant supply line to the coolant return line. An intermediate pressure is brought about between the hydraulic resistances. By varying the hydraulic resistances, the intermediate pressure can be influenced so that it corresponds to the coolant pressure acting at the piston. Advantageously, a pressure taken off between the hydraulic resistances is applied to the valve, so that activation of the friction elements which is free of reaction from the coolant pressure at the piston can take place via a control pressure. The hydraulic resistances can be constituted as restrictors, chokes, cross-sectional narrowings and/or hydraulic fluid lines of appropriate length and diameter, for example. The desired pressure drop can be set by means of the size of the cross-sectional narrowing and/or length and diameter of the portion of the bypass line before and after the take-off of the return pressure line, for example. The overall hydraulic resistance in the bypass line set by means of the restrictors determines the level of volume flow of the hydraulic fluid in the bypass line, or the volume flow through the friction elements.

In a development of the invention, the valve is a 3/3-way valve. The valve has a connection to the clutch, with a working pressure line and with a zero outlet which communicates with a transmission sump. In this connection, the valve can occupy three operating positions. In the first operating position, the working pressure is connected to the clutch, in the second operating position, the working pressure is separated from the clutch, and, in the third operating position, the clutch is connected to the zero outlet. By applying a control pressure on the one hand and a returned operating pressure on the other hand, an operating pressure present at the clutch and thus the torque transmitted via the friction elements can be adjusted with this valve.

In a further development of the invention, the valve has a slide which is arranged axially displaceably within a longitudinal bore of the housing. A 3/3-way valve can be brought about cost-effectively in the transmission by means of a slide.

In a further development of the invention, the slide has in an end region a slide bore with a piston arranged therein, which bore communicates with a peripheral groove of the slide. Operating pressure is present in the peripheral groove and, via a duct, is also present in the slide bore. The operating pressure is thus led back to an area on the slide corresponding in size to the piston area. By varying the piston area, a desired intensification, that is the ratio of control pressure to operating pressure, can be set.

In a further development of the invention, the slide has an annular surface which can be acted on with the pressure from the return pressure line. The return pressure gives rise to a force on the slide which advantageously ensures correction of the operating pressure as a function of the coolant pressure acting on the piston.

In a further development of the invention, a valve by means of which the pressure in the coolant supply line and/or the coolant return line can be limited to a maximum value is arranged in the coolant supply line and/or the coolant return line. The valve thus has the function of what is known as a pressure control valve. This effectively prevents the pressure in the coolant supply line and the coolant return line becoming too great and being able to cause damage to the clutch device. This risk exists in particular at very low temperatures and with rapid actuations of the clutch.

In a further development of the invention, a valve by means of which the pressure in the coolant supply line is reduced to a lubricating pressure level and limited to a maximum value is arranged in the coolant supply line. This valve therefore combines the functioning of what are known as a pressure-reducing valve and of a pressure control valve. One valve is thus sufficient for setting a defined lubricating pressure and protecting against excessive pressures in the lubricating system.

In a further development of the invention, the coolant return line of the friction elements and the hydraulic resistance cascade meet at a connection point, and the connection point in turn communicates with a supply of the transmission lubrication system, a cooler being connected before the supply of the transmission lubrication system. The entire coolant flow advantageously flows via the cooler in this arrangement, so that maximum cooling capacity of the friction elements and of the coolant is ensured. The coolant flow through the friction elements can be set by means of the hydraulic resistance cascade.

In a further development of the invention, a line to a cooler which is connected to a supply of a transmission lubrication system branches off from the coolant supply of the friction elements before the branching-off of the hydraulic resistance cascade. Part of the coolant flow flows via the friction elements into the transmission sump, and the other part flows via the cooler into the transmission lubrication system. This arrangement affords the advantage that no coolant which has already been contaminated with particles in the clutch enters the transmission lubrication system.

In a further development of the invention, a cooler is connected into the coolant supply line of the friction elements before the branching-off of the hydraulic resistance cascade and a line branching off which is connected to a supply of a transmission lubrication system is provided. The entire coolant flow flows into the cooler, part of the coolant flow then flows via the friction elements into the transmission sump, and the other part flows into the transmission lubrication system. This arrangement affords the advantage that the entire coolant flow flows via the cooler and no coolant which has already been contaminated with particles in the clutch enters the transmission lubrication system.

In a further development of the invention, the friction elements are components of a wet starting clutch. The device according to the invention makes it possible to automate a wet starting clutch so that engagement, disengagement and permanent slip operation can be performed with great comfort for the driver.

Further features and feature combinations emerge from the description and the drawings. Concrete illustrative embodiments of the invention are explained in greater detail in the description below and are shown in simplified form in the drawings.

DETAILED DESCRIPTION OF THE INVENTION

Identical components in FIGS. 1-4 are designated with the same reference numbers below.

Figure 1:
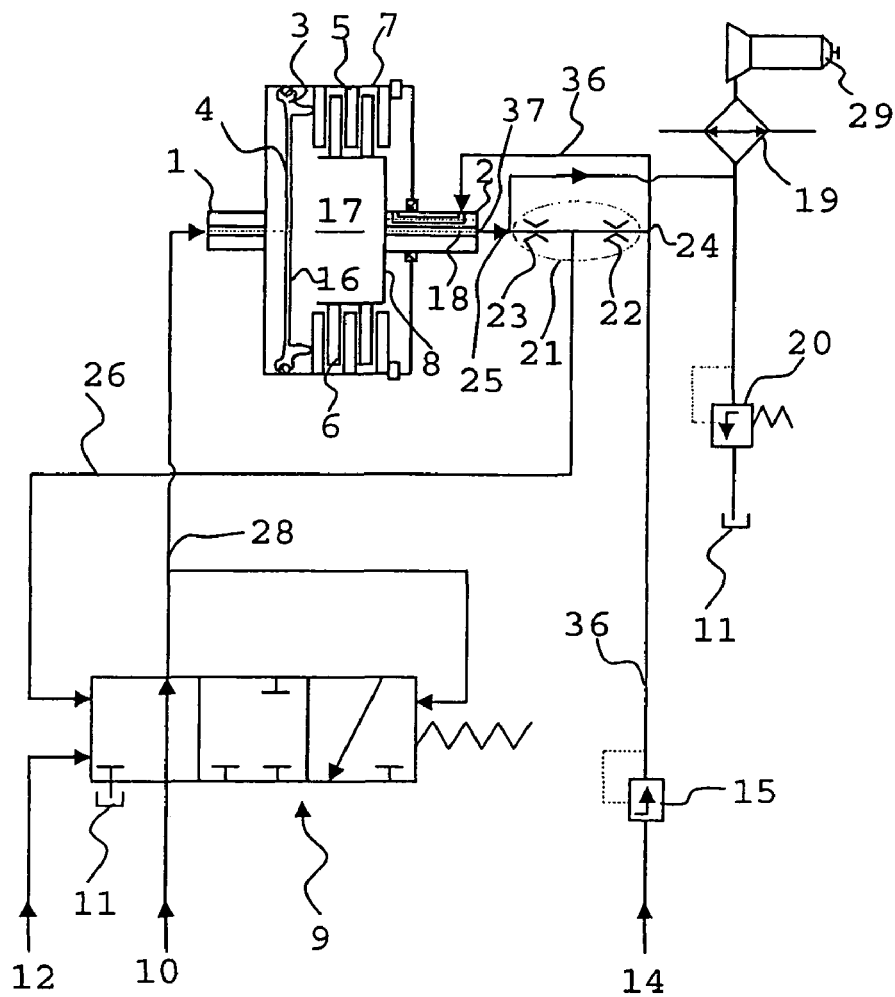
FIG. 1 shows a diagrammatic illustration of a clutch device according to the invention.
Figure 2:
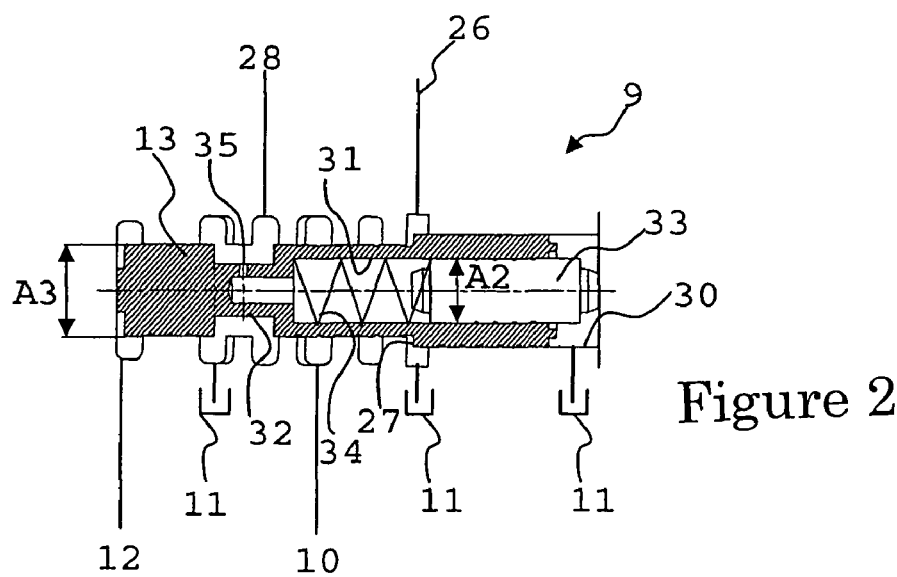
FIG. 2 shows an embodiment of a valve of the device shown in FIG. 1.

A hydraulically activatable clutch device of a transmission is illustrated diagrammatically in FIG. 1. The clutch device can be used in a hydrodynamic converter, as a lock-up clutch, or as a wet starting clutch.

The clutch illustrated in FIG. 1 connects an input shaft 1 to an output shaft 2. For this purpose, a piston 3 is provided, the first piston area 4 of which can be acted on with an operating pressure, as a result of which the piston 3 presses against friction elements 5, 6 designed as outer and inner disks. The outer disks are connected to the input shaft 1 by means of an outer-disk carrier 7, and the inner disks 6 are connected to the output shaft 2 by means of an inner-disk carrier 8. When the first piston area 4 is acted on with pressure, the friction surfaces of the inner and outer disks are pressed against one another, so that torque can be transmitted from the input shaft 1 to the output shaft 2.

Control of the operating pressure is effected by means of a 3/3-way valve 9. The operating pressure present in the line 28 is derived from the working pressure present in the line 10. In this connection, the working pressure is the highest pressure occurring in the entire system and is up to 22 bar. The 3/3-way valve has three operating positions. In the first operating position, the working pressure is delivered directly to the clutch; in the second operating position, the connection from the connection 10 to the clutch is separated; and, in the third operating position, the operating pressure line 28 is connected to a zero outlet 11. These operating positions can be brought about by a slide which moves axially in a bore; for example, see FIG. 2. The operating pressure can be set via the control pressure present at the connection 12. The slide 13 has a slide bore 31 in which a piston 33 is arranged. The piston 33 is supported on one side on a housing wall and on the other side on the slide 13 via a spring 34. The slide bore 31 is connected to a peripheral groove 32 via a duct 35, so that operating pressure is present in the slide bore 31. In addition to the spring force, a force resulting from the operating pressure returned via the duct 35 and acting on the area A2 acts on the slide 13, which force acts counter to a force resulting from the control pressure acting on the area A3. By specifying the control pressure, a desired operating pressure which is derived from the working pressure present at the connection 10 can be set. The control pressure level is determined by means of a solenoid valve (not illustrated) activated by a control apparatus and assumes a value of up to 6.5 bar.

The spring 34 has the function of keeping the slide 13 and the piston 33 in a defined position; in principle, the functioning of the valve 9 is also ensured without this spring.

As shown in FIG. 1, coolant is fed to the disk clutch via the line 14. The coolant is an oil which is also used as a lubricant for wear reduction in addition to the function as coolant. A pressure-reducing valve 15 reduces the pressure from working pressure level to a lubricating pressure level of approximately 5 bar. The cooling oil flows via a supply line 36 in the output shaft 2 to the disk set comprising outer and inner disks 5, 6. The cooling oil flow prevents overheating of the thermally greatly stressed outer and inner disks 5, 6. At the same time, the cooling oil ensures a constant coefficient of friction. After flowing through the disks, the cooling oil collects in the region 17, which is delimited on one side by the second side 16 of the piston 3. The cooling oil is subsequently supplied to mechanical components in the transmission such as gearwheels or bearings, for example, via a return bore 18 or via a coolant return line 37 and an interposed cooler 19. In order to prevent damage to the components by excessive pressures, a pressure control valve 20 is provided, which limits the pressure to a maximum value of approximately 3.5 bar.

A hydraulic resistance cascade 21 designed as a restrictor cascade is interposed as a bypass line between the coolant supply line 36 and the return line 37. The restrictor cascade 21 has a first and a second restrictor 22, 23 connected one behind another.

The volume flow through the bypass line is small owing to the throttling effect of the restrictors 22, 23; the main volume flow preferably flows to the disk set. An intermediate pressure averaged from the pressure present at the coolant supply line 36 and return line 37 is brought about between the restrictors. Provided that the pressure drop of the cooling oil from the connection point 24 of the restrictor cascade 21 to the collecting region 17 is approximately the same as the pressure drop of the cooling oil from the collecting region 17 to the connection point 25 of the restrictor cascade 21 and in this connection the restrictors 22, 23 are the same, the same pressure is advantageously present between the restrictors as in the collecting region 17.

In the case of different pressure drops between collecting region 17 and connection point 24 and between collecting region 17 and connection point 25, the size of the restrictors 22, 23 can be matched in such a way that the pressure of the collecting region 17 is still brought about between them.

By varying the hydraulic resistance of the restrictors 23, 24, the cooling oil volume flow through the disk clutch can advantageously be set. The cooling oil quantity not necessary for cooling the disk clutch flows into the cooler 19 avoiding the disk clutch. The cooling oil volume flow through the disk clutch can also be set using a single restrictor, for example the restrictor 22 or 23. Avoiding superfluous cooling oil flowing through the disk clutch reduces pressure losses in the cooling oil circuit.

The pressure in the collecting region 17 acts directly on the second side 16 of the piston 3. The return pressure line 26 branching off between the restrictors 22, 23 is connected to the valve 9.

The pressure present in the return pressure line 26 acts on a surface of the valve 9, so that in this way a force component which is directed in the same direction as the force component resulting from the control pressure and counter to the spring force and the force component resulting from the operating pressure acts on the valve. As can be seen from FIG. 2, the pressure present in the return pressure line 26 acts on the annular surface 27 on the slide 13.

The clutch device according to the invention makes it possible to activate the disk clutch without fluctuations of the lubricating pressure having an unfavorable effect on the desired torque transmission action of the disk clutch. For example, the operating pressure rises slowly during a starting operation of a motor vehicle, so that a slowly increasing torque can be transmitted via the disk clutch. An increase in the cooling oil pressure in the collecting region 17 of the clutch would lead to the piston 3 being pushed away from the disk set, the pressing force of the disks falling and the torque transmitted decreasing abruptly. A vehicle driver experiences such acceleration variations as uncomfortable. It is the aim of the clutch device according to the invention to ensure that the pressing force exerted by the piston 3 on the disk set is independent of the cooling oil pressure. For this purpose, the pressure in the collecting region 17 is advantageously determined by means of the restrictor cascade 21 and supplied to the valve 9 as a control variable. If, for example, the pressure in the collecting region 17 rises, the pressure between the restrictors 22, 23 of the restrictor cascade 21 rises to the same degree. This rise is applied to the annular surface 27 of the valve 9, or of the slide 13, via the return pressure line 26, so that the operating pressure in the line 28 rises. In the opposite case, that is with falling pressure in the collecting region 17, the operating pressure in the line 28 falls. If the annular surface 27 is the same size as the piston area A2, the operating pressure in line 28 changes to the extent the return pressure in line 26 varies. With this arrangement, the system can be designed in such a way that the force exerted by the piston 3 on the disk set can be set accurately via the control pressure 12 independently of the fluctuating pressure in the collecting space 17. The torque which can be transmitted by the disk clutch can consequently also be set precisely, as a result of which comfortable closing and opening of the disk clutch is ensured. The torque transmitted by the clutch is thus free from a reaction of the cooling oil pressure. Equally, the disk clutch can also be operated with a reliably settable permanent slip. The permanent slip contributes to damping torsional vibrations when the motor vehicle is being driven.

In a modified embodiment (not shown), no restrictor cascade 21 is connected between the connection points 24, 25. There is a connection 26 to the valve 9 from the connection point 24 or 25. In this case, the pressure taken off lies above or below the pressure level in the collecting space 17 owing to the pressure drop in the line from the collecting space 17 to the connection point 24 or 25. This pressure offset can be compensated for by means of suitable selection of the spring 34 and/or appropriate control of the control pressure in line 12.

Figure 3:
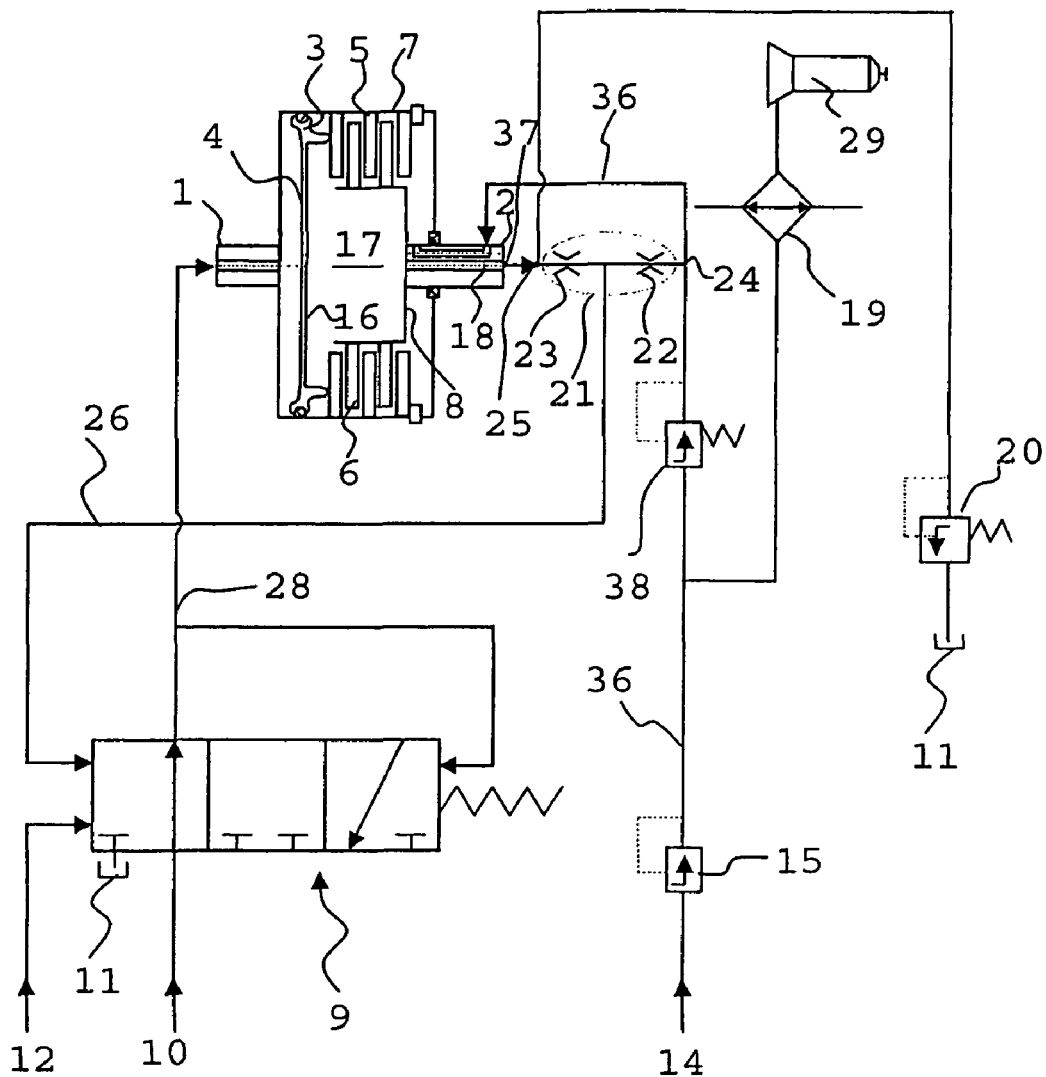
FIG. 3 shows a clutch device according to the invention with a cooler arrangement which is modified in relation to FIG. 1.

In FIG. 3, a line which supplies part of the cooling oil flow via a cooler 19 to the mechanical parts 29 of the transmission branches off from the cooling oil supply line 36 after the pressure-reducing valve 15. The pressure of the cooling oil is set to 5 bar. The remaining part of the cooling oil flow flows via a further pressure-reducing valve, which sets a pressure of 1.5-2.5 bar, into the clutch to the friction elements 5, 6, for cooling the disks, and in part to the restrictor cascade 21. After flowing through the friction elements 5, 6, the cooling oil flows through the collecting space 17, the return bore 18, the cooling oil return line 37, collects with the cooling oil from the restrictor cascade 21 and flows via a pressure control valve 20 and via a zero outlet 11 into the transmission sump. The pressure control valve 20 sets a pressure of 0.8 bar, as a result of which a minimum pressure is defined on the second piston area. The pressure-reducing valve 38 and the pressure control valve 20 stabilize the pressure in the collecting space 17 and limit the value range, which makes correction of the operating pressure easier.

The restrictor cascade 21 is still arranged between the coolant supply and return lines 36, 37. This arrangement effectively prevents abraded material of the inner and outer disks in the unfiltered cooling oil flowing to the mechanical components 29 of the transmission. The cooling oil therefore flows into the transmission sump. A filter which separates impurities contained in the oil taken in is arranged in the transmission sump.

Figure 4:
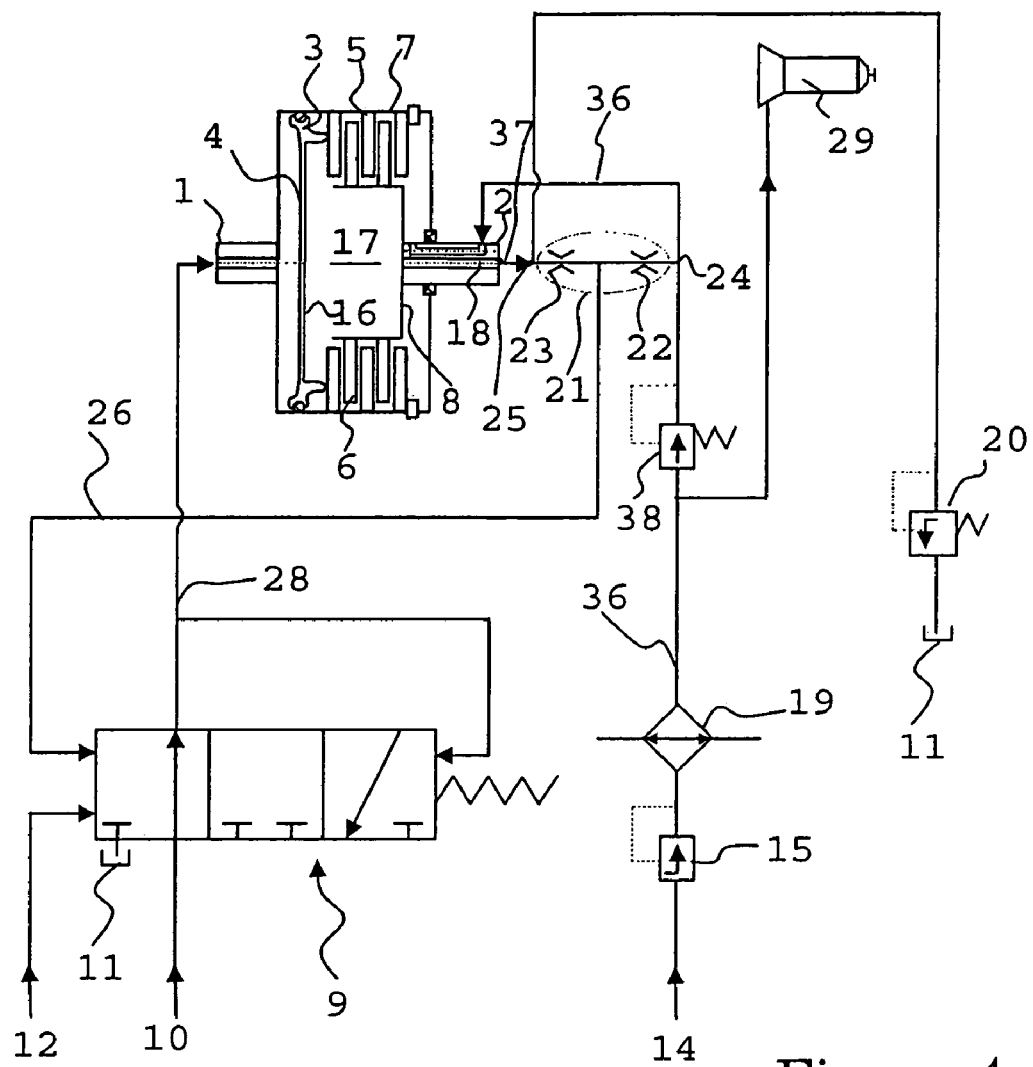
FIG. 4 shows a clutch device according to the invention with a cooler arrangement which is modified in relation to FIG. 1 and FIG. 3.

FIG. 4 shows an arrangement which provides the cooler 19 in the cooling oil line 14 after the pressure-reducing valve 15. After the cooler in the flow direction, a line which supplies part of the cooling oil flow to the mechanical parts 29 of the transmission branches off from the supply line 36. The remaining part of the cooling oil flow flows via a further pressure-reducing valve 38 into the clutch to the friction elements 5, 6, for cooling the disks, and in part into the restrictor cascade 21. The cooling oil from the clutch and the restrictor cascade 21 collects at the connection point 25 and flows from there into the transmission sump according to the arrangement shown in FIG. 3. This arrangement ensures that both the friction elements 5, 6 and the mechanical components 29 of the transmission are supplied with cooled cooling oil.

Figure 5:
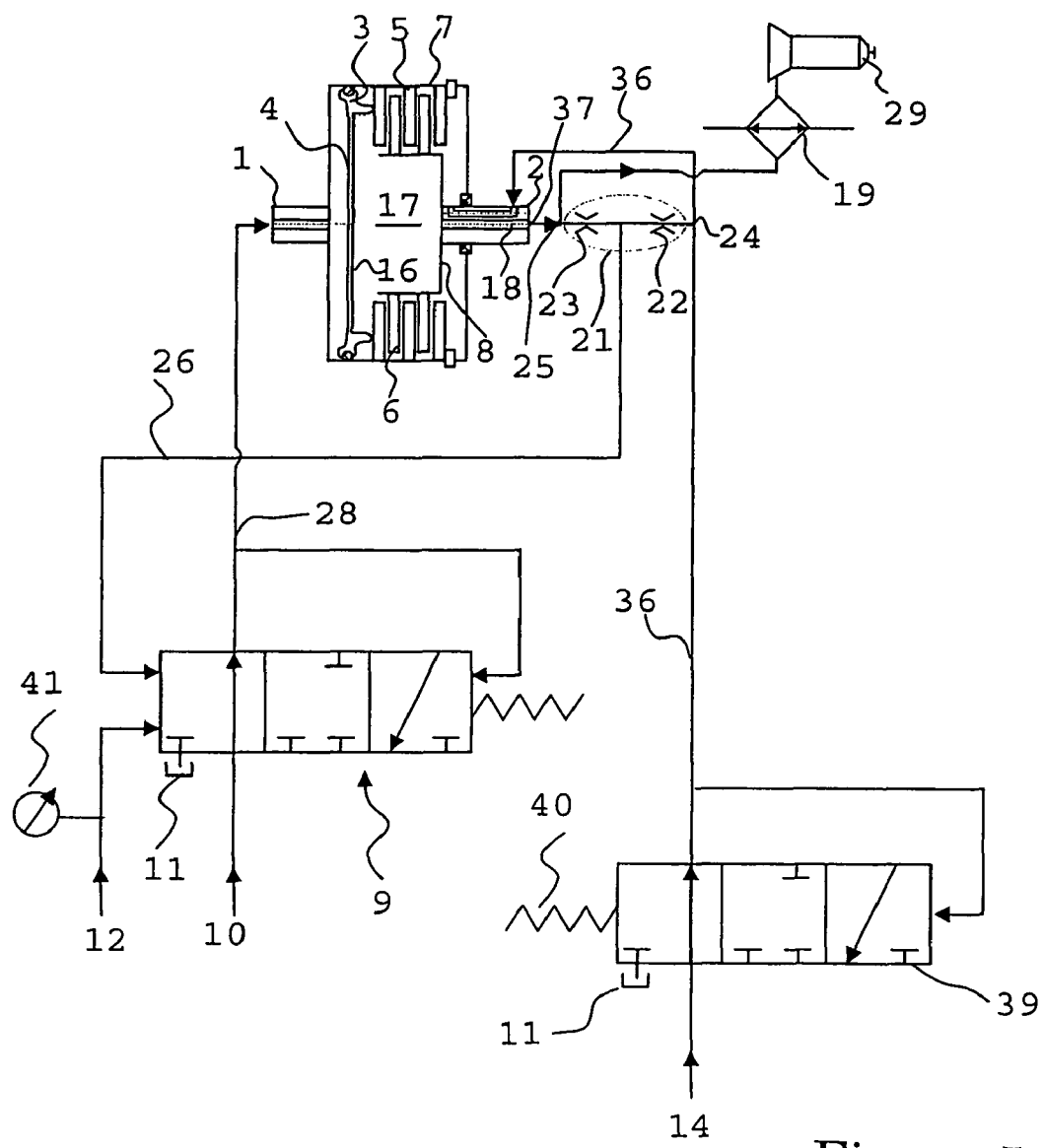
FIG. 5 shows a clutch device according to the invention with a cooler arrangement which is modified in relation to each of FIGS. 1, 3, and 4.

In FIG. 5, the pressure-reducing valve 15 has, in comparison with FIG. 1, been replaced by a 3/3-way valve 39. Firstly, this 3/3-way valve 39 functions like a pressure-reducing valve and in the same way as the pressure-reducing valve 15 reduces the pressure from working pressure level to a lubricating pressure level of approximately 5 bar. For this purpose, the pressure of the coolant supply line 36 is led back to the 3/3-way valve 39 and acts counter to the spring force of a spring 40. As long as the pressure in the coolant supply line 36 is below the lubricating pressure level, the 3/3-way valve is located in the position illustrated, in which the coolant supply line 36 is connected to the working pressure. As soon as the pressure in the coolant supply line 36 corresponds to the lubricating pressure level, the 3/3-way valve 39 occupies a position in which the coolant supply line 36 is closed. If the pressure in the coolant supply line 36 is above the lubricating pressure level, the 3/3-way valve 39 connects the coolant supply line 36 to a zero outlet 11 to the transmission sump. This consequently additionally prevents the pressure in the coolant supply line 36 from being able to rise above the lubricating pressure level. An excessive pressure increase in the coolant return line 37 is thus likewise prevented. For this reason, a pressure control valve is not provided in the coolant return line 37 either in the embodiment according to FIG. 5.

Such a 3/3-way valve can also be used in the clutch device according to FIG. 3. The pressure control valve in the coolant return line could then be dispensed with there as well.

The clutch device according to FIG. 5 also has a pressure sensor 40, by means of which the control pressure 12 of the 3/3-way valve 9 can be measured. The control pressure 12 is intensified by the 3/3-way valve 9 with a fixed intensification factor. The value resulting from the control pressure 12 multiplied by the intensification factor corresponds to the differential pressure at the piston 3 of the clutch. This differential pressure is a direct measure of the transmissible torque of the clutch. Measurement of the pressure in the operating pressure line 28 would not lead to the desired result as this pressure is influenced by the pressure in the return line 26 and thus does not constitute a measure of the differential pressure at the piston 3.

A pressure sensor arranged in this way can also be used in the clutch devices according to FIGS. 1, 3 and 4.

The invention claimed is:

1. A clutch device for a motor vehicle, comprising:
   friction elements around which coolant flows,
   a piston by which the friction elements can be pressed against one another for torque transmission, a first piston side being acted on with operating pressure and a second piston side being acted on with coolant pressure,
   a valve by which the operating pressure can be set, and
   a device which makes reaction of the coolant pressure on the operating pressure possible,
   wherein the device is a hydraulic resistance cascade and is connected between a coolant supply line and a coolant return line of the friction elements, and
   wherein a return pressure line branching off in the center of the hydraulic resistance cascade is connected to the valve.

2. The clutch device as claimed in claim 1, wherein the valve is a 3/3-way valve.

3. The clutch device as claimed in claim 2, wherein the valve has a slide which is arranged axially displaceably within a longitudinal bore of a housing.

4. The clutch device as claimed in claim 3, wherein the slide has, in an end region, a slide bore with a piston arranged therein, and wherein the bore communicates with a peripheral groove of the slide.

5. The clutch device as claimed in claim 4, wherein the slide has an annular surface which can be acted on with the pressure from the return pressure line.

6. The clutch device as claimed in claim 3, wherein the slide has an annular surface which can be acted on with the pressure from the return pressure line.

7. The clutch device as claimed in claim 2, further comprising a pressure valve by which pressure in at least one of the coolant supply line and the coolant return line can be limited to a maximum value arranged in at least one of the coolant supply line and the coolant return line.

8. The clutch device as claimed in claim 1, wherein the valve has a slide which is arranged axially displaceably within a longitudinal bore of a housing.

9. The clutch device as claimed in claim 8, wherein the slide has, in an end region, a slide bore with a piston arranged therein, and wherein the bore communicates with a peripheral groove of the slide.

10. The clutch device as claimed in claim 9, further comprising a pressure valve by which pressure in at least one of the coolant supply line and the coolant return line can be limited to a maximum value arranged in at least one of the coolant supply line and the coolant return line.

11. The clutch device as claimed in claim 8, wherein the slide has an annular surface which can be acted on with the pressure from the return pressure line.

12. The clutch device as claimed in claim 11, further comprising a pressure valve by which pressure in at least one of the coolant supply line and the coolant return line can be limited to a maximum value arranged in at least one of the coolant supply line and the coolant return line.

13. The clutch device as claimed in claim 8, further comprising a pressure valve by which pressure in at least one of the coolant supply line and the coolant return line can be limited to a maximum value arranged in at least one of the coolant supply line and the coolant return line.

14. The clutch device as claimed in claim 1, further comprising a pressure valve by which pressure in at least one of the coolant supply line and the coolant return line can be limited to a maximum value arranged in at least one of the coolant supply line and the coolant return line.

15. The clutch device as claimed in claim 14, wherein the pressure valve is a valve by means of which the pressure in the coolant supply line can be reduced to a lubricating pressure level and can be limited to a maximum value is arranged in the coolant supply line.

16. The clutch device as claimed in claim 1, wherein the coolant return line and the hydraulic resistance cascade meet at a connection point, wherein the connection point in turn communicates with a supply of a transmission lubrication system, and wherein a cooler is connected before the supply of the transmission lubrication system.

17. The clutch device as claimed in claim 1, wherein a line to a cooler which is connected to a supply of a transmission lubrication system branches off from the coolant supply line before the hydraulic resistance cascade branches off.

18. The clutch device as claimed in claim 1, wherein a cooler is connected into the coolant supply line before the hydraulic resistance cascade branches off, and wherein a line branching off, which is connected to a supply of a transmission lubrication system, is provided.

19. The clutch device as claimed in claim 1, wherein the friction elements are components of a wet starting clutch.

20. A transmission for a motor vehicle comprising a clutch device as claimed in claim 1.

* * * * *